United States Patent
Yang (10) Patent No.: US 10,295,817 B2
(45) Date of Patent: May 21, 2019

(54) STEREO IMAGING SYSTEM

(71) Applicant: General Electric Company, Schenectady, NY (US)

(72) Inventor: Dongmin Yang, Camillus, NY (US)

(73) Assignee: General Electric Company, Schenectady, NY (US)

( * ) Notice: Subject to any disclaimer, the term of this patent is extended or adjusted under 35 U.S.C. 154(b) by 76 days.

(21) Appl. No.: 15/604,880

(22) Filed: May 25, 2017

(65) Prior Publication Data

US 2017/0351085 A1    Dec. 7, 2017

Related U.S. Application Data

(60) Provisional application No. 62/343,988, filed on Jun. 1, 2016.

(51) Int. Cl.
| | |
|---|---|
| *G02B 23/24* | (2006.01) |
| *H04N 13/204* | (2018.01) |
| *H04N 13/218* | (2018.01) |

(52) U.S. Cl.
CPC ..... *G02B 23/2415* (2013.01); *G02B 23/2484* (2013.01); *H04N 13/204* (2018.05); *H04N 13/218* (2018.05); *H04N 2213/001* (2013.01)

(58) Field of Classification Search
None
See application file for complete search history.

(56) References Cited

U.S. PATENT DOCUMENTS

| | | | | |
|---|---|---|---|---|
| 6,751,020 | B2 * | 6/2004 | Sugawara | H04N 13/211 359/462 |
| 7,170,677 | B1 | 1/2007 | Bendall et al. | |
| 7,564,626 | B2 | 7/2009 | Bendall et al. | |
| 8,970,934 | B2 | 3/2015 | Yang | |
| 9,069,181 | B2 | 6/2015 | Harding et al. | |
| 9,232,151 | B1 * | 1/2016 | Azuma | H04N 5/2258 |

(Continued)

FOREIGN PATENT DOCUMENTS

| | | | | |
|---|---|---|---|---|
| DE | 10-2015-220566 A1 * | 4/2017 | | G02B 27/00 |
| WO | WO-2013114725 A1 * | 8/2013 | | G02B 23/26 |

(Continued)

*Primary Examiner* — Reza Aghevli
(74) *Attorney, Agent, or Firm* — Mintz Levin Cohn Ferris Glovsky and Popeo, P.C.

(57) ABSTRACT

A stereoscopic optical system that includes an image member that is located at a position along a center optical axis and that has a first stereoscopic image area on a first side of the optical axis for receipt of a first stereoscopic image thereon and a second, separate stereoscopic image area on a second, separate side of the optical axis for receipt of a second, separate stereoscopic image thereon. The system includes an optical arrangement extending along the center optical axis and includes a roof prism with first and second roof segments. The arrangement is configured to transmit image-forming rays passing through the first roof segment to the first stereoscopic image area along a first optical path through the arrangement and is configured to transmit image-forming rays passing through the second roof segment to the second stereoscopic image area along a second, different optical path through the arrangement.

18 Claims, 7 Drawing Sheets

(56) References Cited

U.S. PATENT DOCUMENTS

| | | | |
|---|---|---|---|
| 2009/0201366 A1* | 8/2009 | Sase | G02B 21/361 |
| | | | 348/79 |
| 2013/0170029 A1* | 7/2013 | Morita | G02B 27/22 |
| | | | 359/464 |
| 2015/0281674 A1* | 10/2015 | Sato | H04N 13/207 |
| | | | 348/49 |
| 2016/0282602 A1* | 9/2016 | Togino | A61B 1/00 |
| 2018/0176471 A1* | 6/2018 | Wippermann | G02B 13/001 |
| 2018/0241920 A1* | 8/2018 | Wippermann | G02B 5/08 |

FOREIGN PATENT DOCUMENTS

| | | | | |
|---|---|---|---|---|
| WO | WO-2015083439 A1 * | 6/2015 | | A61B 1/00 |
| WO | WO-2016006505 A1 * | 1/2016 | | G02B 13/04 |

* cited by examiner

FIG. 7

STEREO IMAGING SYSTEM

RELATED APPLICATION

The present application is a non-provisional application and claims benefit of priority from U.S. Provisional Patent Application No. 62/343,988, filed Jun. 1, 2016, which is incorporated herein by reference.

FIELD OF THE SUBJECT MATTER

This subject matter relates generally to the field of borescopes and endoscopes, and more particularly a borescope/endoscope which can provide a 3D image from a single camera and lens system.

BACKGROUND

Figure 1:
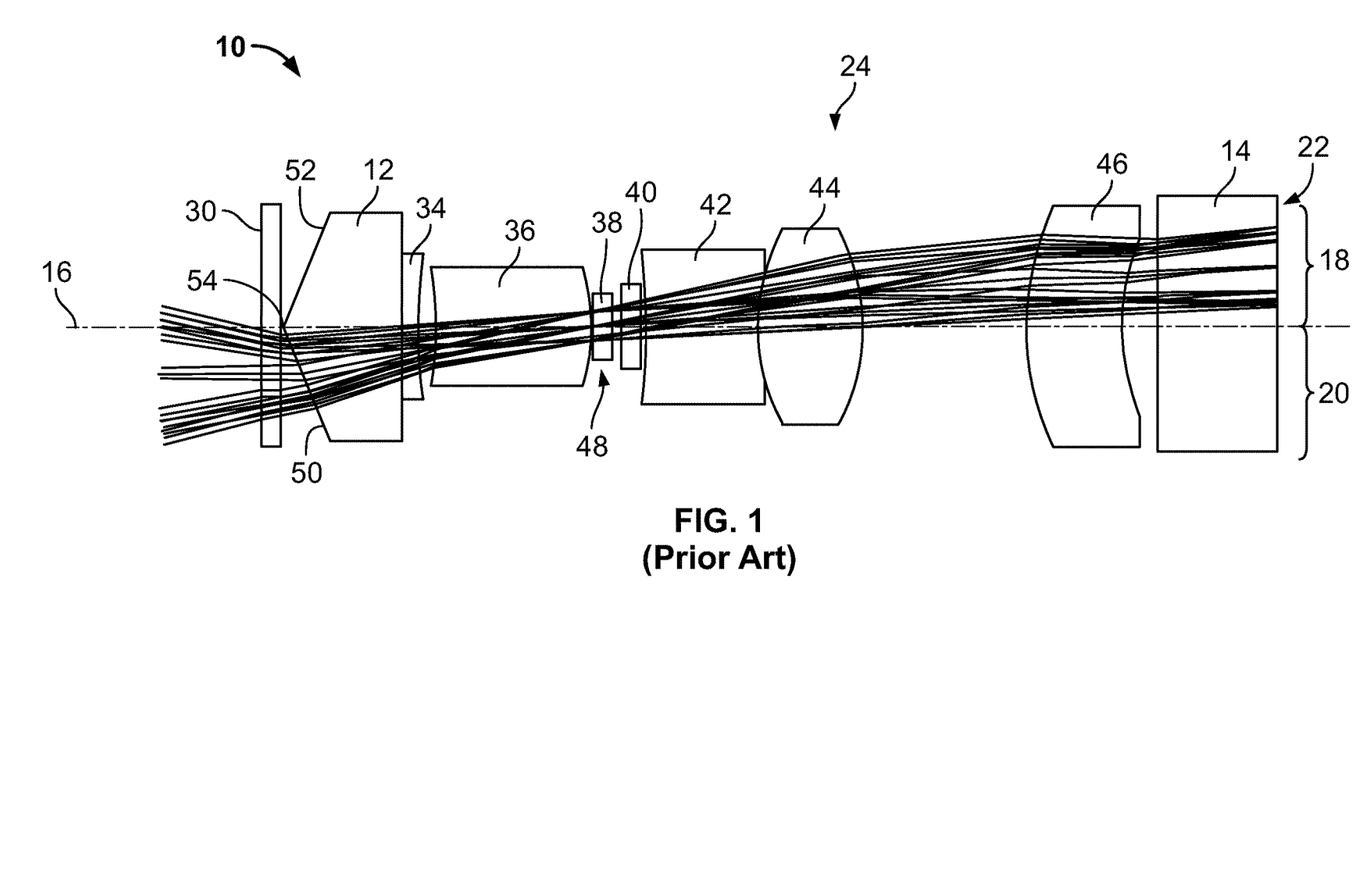
FIG. 1 is a schematic representation of an existing stereo optics design of a stereo imaging system containing a roof prism and a single centered aperture.

Current stereo imaging systems that contain a roof prism (bi-prism) may have imaging aberration issues. With reference to FIG. 1, note that a great amount of optical rays can proceed through each roof segment of a roof prism (only the rays for one of the two roof segments is shown to avoid drawing clutter). Some of these rays will cause image degradation at the image plane.

FIG. 1 is a schematic representation of a stereoscopic optical system 10. It is to be noted at the outset that the existing optical system 10 can have a roof prism 12. However, the existing optical system 10 is of a single aperture optics design and thus can have at least some issues and/or challenges. For example, it is possible for the existing optical system 10 to have an imaging aberration issue. A first issue, imaging aberration, can include color separation, astigmatism and/or field curvatures that can be difficult to correct due to the roof prism nature. A second issue can be that the stereo image separation might be limited by a prism angle and a small envelope size of a borescope or endoscope camera. A third issue can be that the stereo imaging is very sensitive to optical component position deviations from perfection (i.e., tolerances). Such deviations can include axis decentering and/or tilt, and are especially of concern regarding the roof prism position.

An optical system 10, such of that illustrated in FIG. 1 can include an image member 14 located at a position along a center optical axis 16 and a first stereoscopic image area 18 on a first side of the optical axis for receipt of a first stereoscopic image thereon. The system can have a second, separate stereoscopic image area 20 on a second, separate side of the optical axis for receipt of a second, separate stereoscopic image thereon. In the FIG. 1, these are shown in an up and down orientation, but could be translatable to left and right orientation. The image member 14 can be or can at least include an image window (also indicated via reference numeral 14) that has an image plane 22 that contains the first and second image areas 18 and 20. The image plane 22 can be at the right-most surface of the image member 12 as viewed within FIG. 1. The image member 14 could also include an image capturing element, such a charge-coupled display (CCD), etc. The specifics of the image member 14, the possible components contained therein, etc. are not needed for understanding aside from the two stereoscopic image areas 18 and 20 can be present at the image plane 22.

The optical system 10 of FIG. 1 can include an optical arrangement 24 that extends along the center optical axis 16. Proceeding from left to right within FIG. 1 and along the optical axis 16, the overall optical arrangement 24 can include a first window 30, the roof prism 12, a first lens 34, a second lens 36, a second window 38, a third window 40, a third lens 42, a fourth lens 44 and a fifth lens 46. The first window 30, the roof prism 12, the first lens 34, the second lens 36, and the second window 38 may be grouped together as first portion of the optical arrangement. The third window 40, the third lens 42, the fourth lens 44, and the fifth lens 46 may be grouped together as a second portion of the optical arrangement. The first portion may be detachable from the second portion, with at least some of the windows (i.e., first-third windows, 30, 38 and 40) providing boundaries from the outside environment. Such boundaries can provide a barrier to prevent outside influences (e.g., dirt, moisture, etc.) from engaging portions of the optical arrangement (e.g., the lenses). Moreover, it is to be appreciated that the second window 38 can include a single aperture 48 that is to be centered upon the optical axis 16.

The roof prism 32 can have first and second roof segments 50, 52 and an apex 54 that is to be located on the optical axis 16. Within FIG. 1 only rays passing through the first roof segment 50 are shown so as to avoid clutter within the Figure and to allow ease of review and discussion about the issues and concerns regarding the rays passing through the first roof segment. It is to be understood that different rays may be passing through the second roof segment 52 and that similar issues, concerns are present.

With attention to the rays passing through the first roof segment 50, it should be noted that except for the single aperture 48 at the second window 38, which is to be centered on the optical axis 16, there can be limited qualification regarding the passage of the rays through the remainder of the system 10 and to the image plane 20. At least some of the rays cause the noted degradation of the image. Examples of image degradation include undesirable color separation, undesirable contrast, undesirable contrast, image size distortion, image shape distortion, vignetting, etc. It is to be noted that it can be possible for rays to pass through various portions of the lenses that cause or otherwise affect image degradation. Also, recall that the single aperture 48 can be present. As such, both of the two sets of rays for the two images at the images areas 18, 20 must pass through the single aperture 48. With FIG. 1 providing a background, there is a current need for improvements concerning stereo imaging systems, and specifically such stereo imaging systems within borescopes and endoscopes.

BRIEF DESCRIPTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later. Other embodiments are within the scope of the disclosed subject matter.

The subject matter relates to a stereoscopic optical system, with a roof prism, dual apertures and separated ray paths, which provides for improved stereo images.

In accordance with one aspect, the disclosed content provides a stereoscopic optical system that includes an image member that is located at a position along a center optical axis and that has a first stereoscopic image area on a first side of the optical axis for receipt of a first stereoscopic image thereon and a second, separate stereoscopic image area on a second, separate side of the optical axis for receipt of a second, separate stereoscopic image thereon. The stereoscopic optical system includes an optical arrangement extending along the center optical axis and includes a roof prism with first and second roof segments. The optical arrangement is configured to transmit image-forming rays passing through the first roof segment to the first stereoscopic image area along a first optical path through the optical arrangement and is configured to transmit image-forming rays passing through the second roof segment to the second stereoscopic image area along a second, different optical path through the optical arrangement.

In accordance with another aspect, the disclosed content provides a stereoscopic optical system that includes an image member located at a position along a center optical axis and that has a first stereoscopic image area on a first side of the optical axis for receipt of a first stereoscopic image thereon and a second, separate stereoscopic image area on a second, separate side of the optical axis for receipt of a second, separate stereoscopic image thereon. The stereoscopic optical system includes an optical arrangement extending along the center optical axis. The optical arrangement includes a roof prism that has first and second roof segments, and that has an apex located on the center optical axis. The optical arrangement includes a single lens sequence having plural lenses spaced along the center optical axis, with each of the plural lenses having an optical center located on the center optical axis, the single lens sequence being configured to transmit image-forming rays passing through the first roof segment to the first stereoscopic image area along a first optical path and configured to transmit image-forming rays passing through the second roof segment to the second stereoscopic image area along a second, different optical path. The optical arrangement includes at least one element configured to prevent at least some rays passing through the first roof segment from reaching the first stereoscopic image area and to prevent at least some rays passing through the second roof segment from reaching the second stereoscopic image area.

BRIEF DESCRIPTION OF THE DRAWINGS

The foregoing and other aspects of the disclosed subject matter will become apparent to those skilled in the art to which the disclosed subject matter relates upon reading the following description with reference to the accompanying drawings, in which.

DETAILED DESCRIPTION

Example embodiments that incorporate one or more aspects of the disclosed subject matter are described and illustrated in the drawings. These illustrated examples are not intended to be a limitation on the disclosed subject matter. For example, one or more aspects of the disclosed subject matter can be utilized in other embodiments and even other types of devices. Moreover, certain terminology is used herein for convenience only and is not to be taken as a limitation on the disclosed subject matter. Still further, in the drawings, the same reference numerals are employed for designating the same elements.

The subject matter relates to a stereoscopic optical system, with a roof prism, dual apertures within a single lens system and separated ray paths, which provides for improved stereo images. Better images can be provided by selectively preventing some optical rays from proceeding to the image areas.

Current stereo imaging systems that contain a roof prism (bi-prism) may have imaging aberration issues, such as color separation, astigmatism and field curvatures, that can be difficult to correct. Also, for systems that include a roof prism within a borescope or endoscope, there can be limitations associated with the angle of the roof prism and the small size of the envelope of the borescope or endoscope. Thus, stereo image separation can also be limited by such prism angle and such small size of the envelope of the borescope or endoscope. A third issue that can result is related to the fact that stereo imaging is very sensitive to optical component position deviations from perfection (i.e., position tolerances). Such component position tolerances occur during assembly and can include decentering and tilt. Such an issue can be especially problematic in connection with the roof prism position. As such, there is a current need for improvements concerning stereo imaging systems, and specifically such stereo imaging systems within borescopes and endoscopes. The improvements provided by the subject matter can be useful within borescope or endoscope cameras. However, such use within borescope or endoscope cameras need not be a specific limitation.

Figure 2:
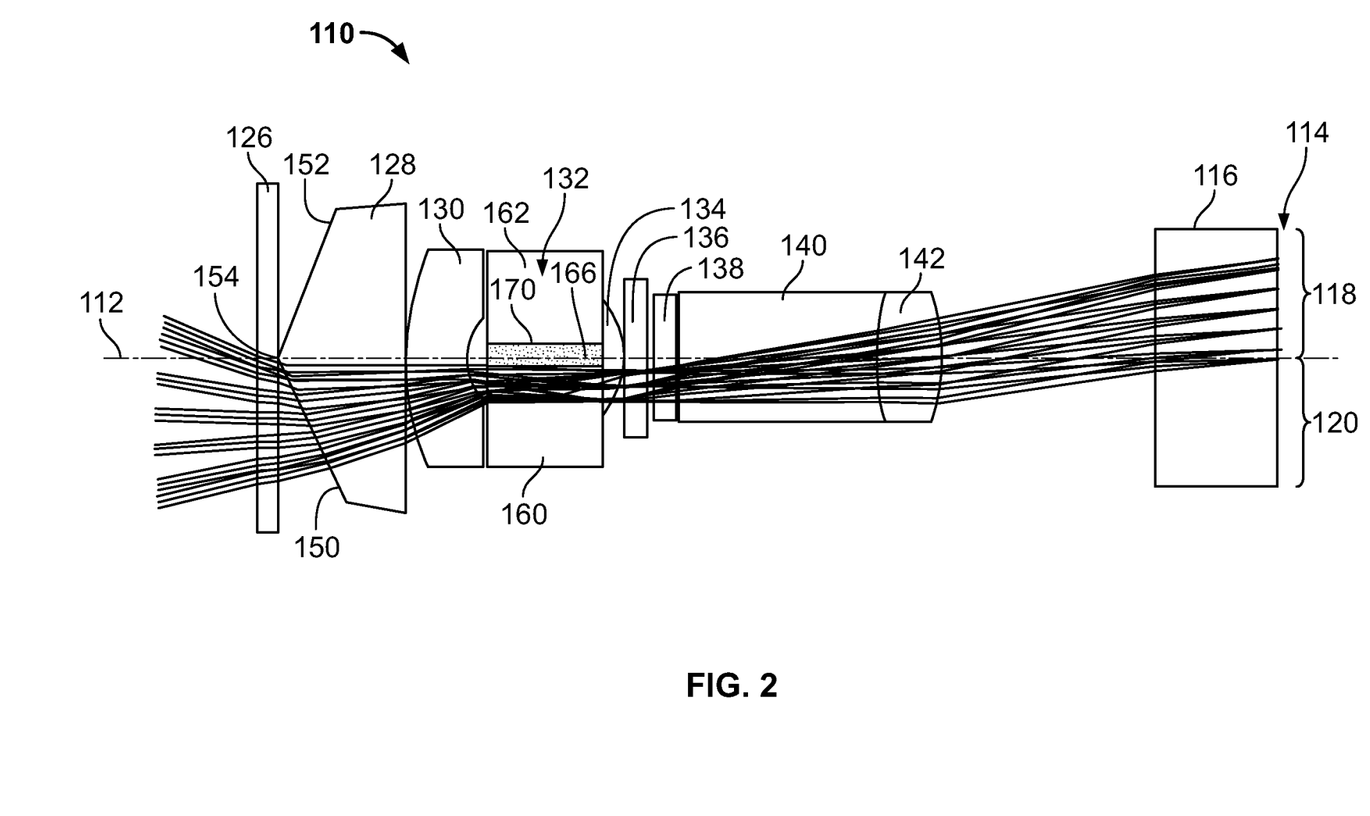
FIG. 2 is a schematic representation of an example of a novel design, first type, showing desired imaging paths of one of two stereo images of a stereo imaging system.

A first, example stereoscopic optical system 110 in accordance with an aspect of the disclosed subject matter is shown within FIG. 2. The stereoscopic optical system 110 can have a center optical axis 112 and an image plane 114, with the image plane being on the right as viewed with the FIG. 2. The stereoscopic optical system 110 of FIG. 2 can include an image member 116 located at the image plane 114. The image member 116 can be or can include an image window (also referred to with reference numeral 116). The image plane 114 is illustrated at the right-most surface of the image window 116 of the shown example as viewed within FIG. 2. The image member could also include an image capturing element, such a charge-coupled display (CCD), etc. The elements illustrated of the image member 116, are possible components contained therein and may vary or not be included at all in some embodiments.

Within the image plane 114 can be: a first stereoscopic image area 118 on a first side of the optical axis 112 for receipt of a first stereoscopic image thereon and a second, separate stereoscopic image area 120 on a second, separate side of the optical axis for receipt of a second, separate stereoscopic image thereon. Within FIG. 2, the first side can be above the optical axis 112 and the second side is below the optical axis. In FIG. 2, these are shown in an up and down orientation, but it is to be appreciated that it is translatable to left and right orientation. Two stereoscopic images, at image areas 118 and 120, respectively, can be formed at the image plane 114.

Proceeding from left to right within FIG. 2 and along the optical axis 112, the overall optical arrangement can include a first window 126, a roof prism (or bi-prism) 128, a first lens 130, a second window 132, a second lens 134, a third window 136, a fourth window 138, a third lens 140 and/or a fourth lens 142. The first window 126, the roof prism 128, the first lens 130, the second window 132, the second lens 134 and the third window 136 may be grouped together as part of a first portion of the optical system 110. The fourth window 138, the third lens 140 and the fourth lens 142 may be grouped together as part of a second portion of the optical system 110. The first portion may be detachable from the second portion, with at least some of the windows (i.e., first, third, and fourth windows 126, 136 and 138) providing boundaries from the outside environment. Such boundaries can provide a barrier to prevent outside influences (e.g., dirt, moisture, etc.) from engaging portions of the optical arrangement (e.g., the lenses).

It is possible to consider the first portion to be a detachable stereo vision system and to consider the second portion together with the image member 116 as a primary camera. The detachable stereo vision system may be attached to the primary camera for the purpose of providing the stereoscopic images. All or part of the sequence of optical elements 126-142 can be considered to be an optical arrangement extending along the optical axis 112. The constituent parts (e.g., the portions 160, 162 and the barrier 170) of the second window 132 can be part of the optical arrangement.

The roof prism 128 can have first and second roof segments 150, 152 and an apex 154. With the shown example, the apex 154 is located on the optical axis 112. Within FIG. 2 only rays passing through the first roof segment 150 are shown so as to allow ease of review and discussion about the issues and concerns regarding the rays passing through the first roof segment 150. It is to be understood that rays can also be passing through the second roof segment 152 and that similar ray progression can occur. It is to be noted in FIG. 2 that the rays passing through the first roof segment 150 may proceed only to the first stereoscopic image area 118. It is to be appreciated that the rays passing through the second roof segment 152 may proceed only to the second stereoscopic image area 120, but as previously mentioned, these rays are omitted for clarity within the Figure.

The lenses within the optical system 110 may have different configurations, surface contours, optical materials, etc. For example, the third and fourth lenses 140, 142 are shown as a doublet. However, in another embodiment, two single lenses for the third and fourth lenses 140, 142 may be utilized. The lenses may have respective optical centers located on the center optical axis 112. The lenses and the roof prism may be of any suitable optical material. For example, the roof prism may be made of sapphire material. Also, the windows may be of any suitable optical material, with one example material being sapphire.

Focusing now upon the second window 132, the second window can be a plano split glass window. As such, the window 132 can be provided as two separate portions or pieces 160, 162 with a separation plane 166 that extends between the two portions. The separation plane 166 can be planar and can extend parallel to the optical axis 112. Specifically, the separation plane 166 can be conjoint with the optical axis 112. As such the optical axis 112 can extend (i.e., lie) in the separation plane 166. In other words, the separation plane 166 can lie on the optical axis 112. An opaque optical barrier 170 can be located at the separation plane 166 of the second window 132. As such, the optical barrier 170 can be within the sequence of optical elements. Within the shown example of FIG. 2, the optical barrier 170 is planar and the optical barrier 170 extends parallel to the center optical axis 112. It is to be noted that the optical barrier 170 is shown with a thickness. The thickness may be exaggerated with the Figure to ensure that the optical barrier 170 is appreciated. To be sure, the thickness of the optical barrier 170 may be varied.

The optical barrier 170 can be configured to block rays that impinge against the optical barrier. As such, the optical barrier 170 can be configured to prevent light rays from passing therethrough. Thus, the optical barrier 170 can prevent at least some rays that pass through the first roof segment 150 from reaching the first stereoscopic image area 118 and can prevent at least some rays that pass through the second roof segment 152 from reaching the second stereoscopic image area 120.

Within the example shown within FIG. 2, the optical barrier 170 can be optically absorbent material or a baffle. The optical barrier 170 can also be a coating, with the coating being between the two portions 160, 162 of the split glass window 132, and the coating extending in the plane that contains the center optical axis 112. The coating can be an applied coating (i.e., applied to one or both of the portions of the split glass window). Alternatively, the optical barrier could be a separate plate (e.g., a metal plate) located between the two portions of the split glass window. The thickness of the barrier (e.g., coating/plate) 170 can be varied and may be chosen based upon various factors such as type, sizing, configuration, etc. of the system and the other components therein.

For each roof segment 150, 152 (i.e., down or up as viewed within the Figures) of the roof prism (or bi-prism) 128, the operation may be basically the same. As such, FIG. 2 illustrates the operation for the first roof segment 150 of the roof prism 128. It is to be understood that the operation for the top of the roof prism 128 can be basically the same, but with rays initially impinging upon the second (top half) roof segment 152 of the roof prism (on the left as viewed within the Figures) and the image being at the lower half of the image plane 114 (on the right as viewed within the Figures). In some embodiments, two apertures are therefore provided. Each of the two apertures may not be centered upon the main, center optical axis. Note that within the example of FIG. 2, the shown rays pass through the plano split glass window 132 without being blocked by the optical barrier/coating 170. However, undesirable rays (i.e., rays that contribute to image degradation) can be blocked by the optical barrier 170.

Figure 3:
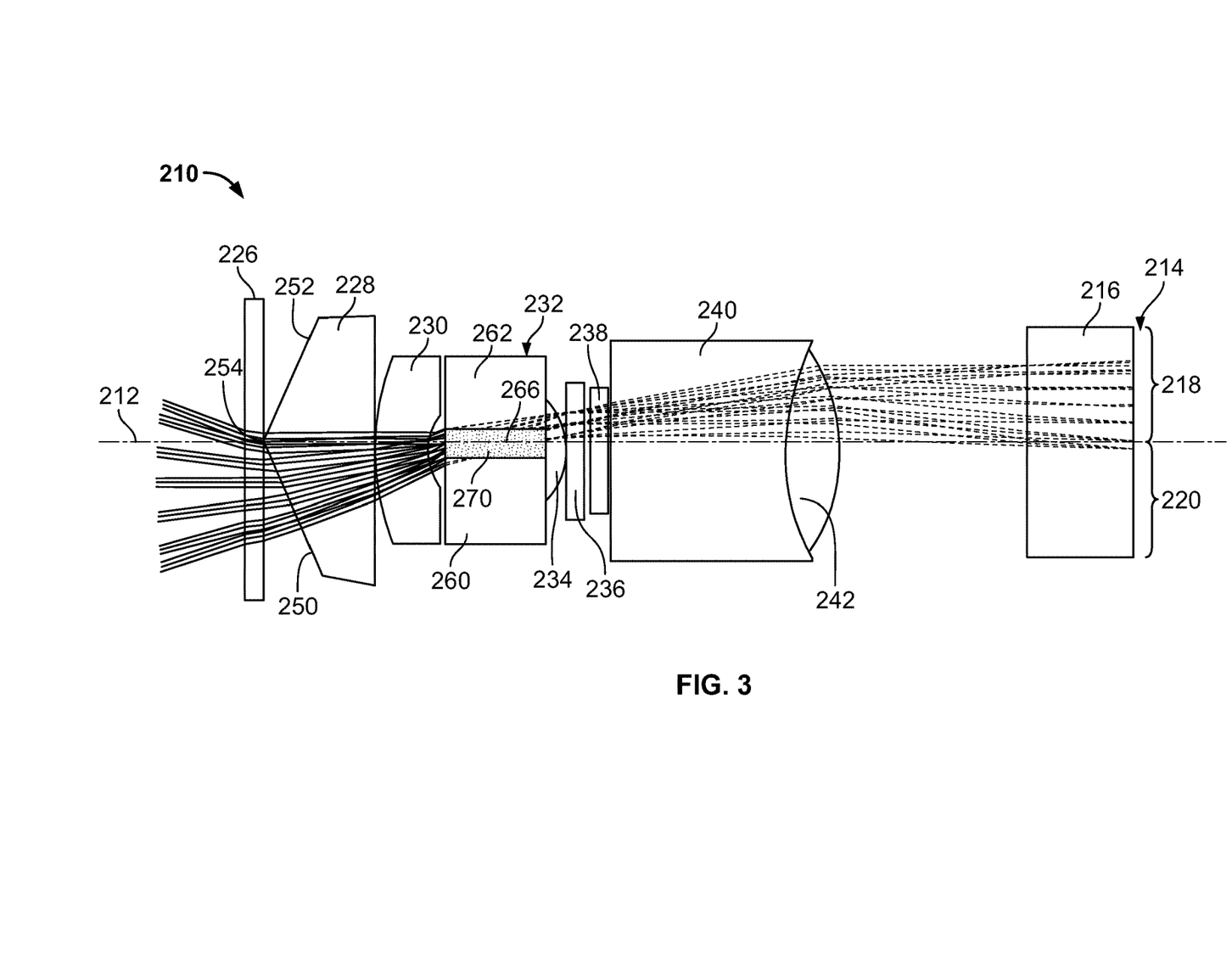
FIG. 3 is a schematic representation of another example of the novel design, first type, but showing that unwanted imaging paths are actually blocked.

Another example stereoscopic optical system 210 is shown within FIG. 3. The example of FIG. 3 has some similarities to the example of FIG. 2, however differences are illustrated, such as some differences of optical devices. Specifically, differences of the lenses of the two examples are present. FIG. 3 illustrates a different embodiment to show variations within the broad scope of the present subject matter are contemplated and provided herein.

Focusing upon the example of FIG. 3, the stereoscopic optical system 210 can have a center optical axis 212 and an image plane 214, with the image plane being on the right as viewed within the Figure. The stereoscopic optical system 210 of FIG. 3 can include an image member 216 located at the image plane 214. The image member 216 can be or can include an image window (with reference numeral 216 also being used for the image window). The image plane 214 is at the right-most surface of the image window 216 of the shown example as viewed within FIG. 3. The image member 216 could also include an image capturing element, such as a charge-coupled display (CCD), etc. The elements illustrated of the image member 216, are possible components contained therein and may vary or not be included at all in some embodiments. Within the image plane 214 can be: a first stereoscopic image area 218 on a first side of the optical axis 212 for receipt of a first stereoscopic image thereon and a second, separate stereoscopic image area 220 on a second, separate side of the optical axis for receipt of a second, separate stereoscopic image thereon. Within the Figure, the first side is above the optical axis 212 and the second side is below the optical axis. In the Figure, these are shown in an up and down orientation, but it is to be appreciated that it is translatable to left and right orientation. The two stereoscopic images can be formed at the image plane 214.

Proceeding from left to right within FIG. 3 and along the optical axis, the overall optical arrangement can include a first window 226, a roof prism (or bi-prism) 228, a first lens 230, a second window 232, a second lens 234, a third window 236, a fourth window 238, a third lens 240 and/or a fourth lens 242. The first window 226, the roof prism 228, the first lens 230, the second window 232, the second lens 234 and the third window 236 may be grouped together as a first portion of the optical arrangement. The fourth window 238, the third lens 240, and the fourth lens 242 may be grouped together as a second portion of the optical arrangement. The first portion may be detachable from the second portion, with at least some of the windows (i.e., first, third and fourth windows 226, 236 and 238) providing boundaries from the outside environment. Such boundaries can provide a barrier to prevent outside influences (e.g., dirt, moisture, etc.) from engaging portions of the optical arrangement (e.g., the lenses). The lenses have respective optical centers located on the center optical axis 212. The lenses and the roof prism may be of any suitable optical material. For example, the roof prism may be made of sapphire material. Also, the windows may be of any suitable optical material, with one example material being sapphire.

The first portion can be a detachable stereo vision system and the second portion together with the image member can be considered a primary camera. The detachable stereo vision system can be attached to the primary camera for the purpose of providing the stereoscopic images. All or part of the sequence of optical elements 226-242 can be considered to be an optical arrangement extending along the optical axis 212. The constituent parts (e.g., the portions 260, 262 and the barrier 270) of the second window 232 can be part of the optical arrangement.

The roof prism 228 can have first and second roof segments 250, 252 and an apex 254. With the shown example, the apex 254 can be located on the optical axis 212. Within FIG. 3 only rays passing through the first roof segment 250 are shown so as to avoid clutter within the drawing and to allow ease of review and discussion about the issues and concerns regarding the rays passing through the first roof segment. It is to be understood that rays are also passing through the second roof segment 252 and that similar issues, concerns, etc. may be present. It is to be noted in FIG. 3 that the rays passing through the first roof segment 250 are directed towards the first stereoscopic image area 218. Within the example shown, however, the shown rays are actually some rays that would degrade the desired image and, as discussed herein, these rays can be prevented from reaching the first stereoscopic image area 218.

Focusing now upon the second window 232, the second window can be a plano split window. As such, the window 232 can be provided as two separate portions or pieces 262 with a separation plane 266 that extends between the two portions. The separation plane 266 can be planar and can extend parallel to the optical axis 212. Specifically, the separation plane can be conjoint with the optical axis 212. As such the optical axis 212 can extend (i.e., lie) in the separation plane 266. In other words, the separation plane 266 can lie on the optical axis. An opaque optical barrier 270 can be located at the separation plane 266 of the second window 232. As such, the optical barrier 270 can be within the sequence of optical elements. Within the shown example of FIG. 3, the optical barrier 270 is planar and the optical barrier extends parallel to the center optical axis 212. It is to be noted that the optical barrier 270 is shown with a thickness. The thickness may be exaggerated in the Figure to ensure that the optical barrier 270 is appreciated. To be sure, the thickness of the optical barrier 270 may be varied.

Within the shown example of FIG. 3, the optical barrier 270 is planar and the optical barrier can extend parallel to the center optical axis 212. The optical barrier 270 can be configured to block rays that impinge against the optical barrier. As such, the optical barrier 270 can be configured to prevent light rays from passing there through. Thus, the optical barrier 270 can prevent at least some rays that pass through the first roof segment 250 from reaching the first stereoscopic image area 214 and can prevent at least some rays that pass through the second roof segment 252 from reaching the second stereoscopic image area 220.

Within the example shown within FIG. 3, the optical barrier 270 can be optically absorbent material or a baffle. Also, within the example shown within FIG. 3, the optical barrier 270 can be a coating, with the coating being between the two portions 260, 262 of the split glass window 232, and the coating extends in the plane that contains the center optical axis 212. The coating can be an applied coating (i.e., applied to one or both of the portions of the split glass window). Alternatively, the optical barrier could be a separate plate (e.g., a metal plate) located between the two portions 260, 262 of the split glass window 232. The thickness of the barrier (e.g., coating/plate) 270 can be varied and may be chosen based upon various factors such as sizing, configuration, etc. of the system and the other components therein.

For each roof segment 250, 252 (i.e., down or up as viewed within the Figures) of the roof prism (or bi-prism) 228, the operation may be basically the same. As such, FIG. 3 shows an operation condition for the first roof segment 250 of the roof prism 228. It is to be understood that the operation for the second roof segment 252 of the roof prism 228 may be basically the same, but with rays initially impinging upon the second portion of the roof prism and the image being at the second stereoscopic image area 220 of the image plane 214. Two apertures are provided. Each of the two apertures may not be centered upon the main, center optical axis 212. Note that within the previous example of FIG. 2, the shown rays pass through the plano split window without being blocked by the barrier/coating. However, the illustrated rays as shown within the currently discussed example of FIG. 3 are fictitious and are only presented to indicate a point. When the embodiment discussed is implemented, these undesirable rays (i.e., rays that contribute to image degradation) are actually being blocked by the optical barrier 270 so that these particular rays do not reach the first stereoscopic image area 218. Within the Figure the rays are shown via dash-phantom lines beyond the optical barrier 270 to indicate that the rays do not actually exist. Accordingly, the image is not degraded by these rays since they are blocked. Undesirable rays (i.e., rays that contribute to image degradation), which are not shown as previously mentioned for clarity within the Figure, that proceed through the second roof segment 252 may be blocked by the barrier 270 so that these particular rays do not reach the second stereoscopic image area 220. Therefore, the stereoscopic optical system 210 may provide improved image performance for each of the two stereoscopic images 218, 220.

FIGS. 2 and 3 provide examples of stereoscopic optical systems (e.g., 210) that utilize an opaque optical barrier (e.g., 270) located within the sequence of optical elements. It is appreciated that within the examples of FIGS. 2 and 3, the opaque optical barrier (e.g., 270), which is between the two portions (e.g., 218, 220) of the window (e.g., 232), is located at a position spaced from the roof prism (e.g., 228) by at least one optical element. Specifically, at least one lens (e.g., 230) may be interposed between the roof prism (e.g., 228) and the window (e.g., 232) within which the optical barrier (e.g., 270) is located, however, such location of the optical barrier (e.g., 270) can be varied. The optical barrier (e.g., 270) can be at a different location within the overall sequence of optical elements within an optical arrangement of the stereoscopic optical system. Within each of the examples of FIGS. 2 and 3, at least one element is configured to prevent at least some rays passing through the first roof segment from reaching the first stereoscopic image area and to prevent at least some rays passing through the second roof segment from reaching the second stereoscopic image area. Additional examples of such are presented herein following.

Figure 4:
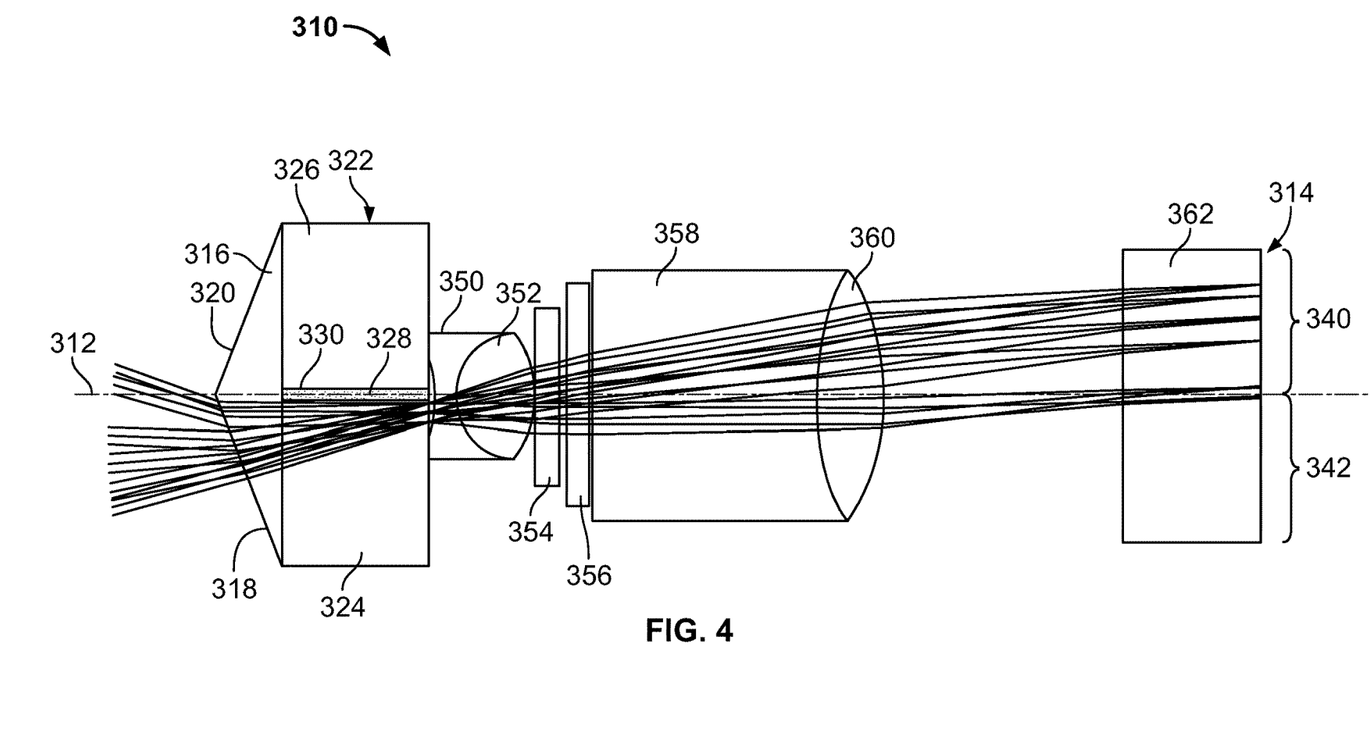
FIG. 4 is a schematic representation of yet another example of the novel design, first type, showing a possible lens/window variant and showing desired imaging paths of one of two stereo images.
Figure 5:
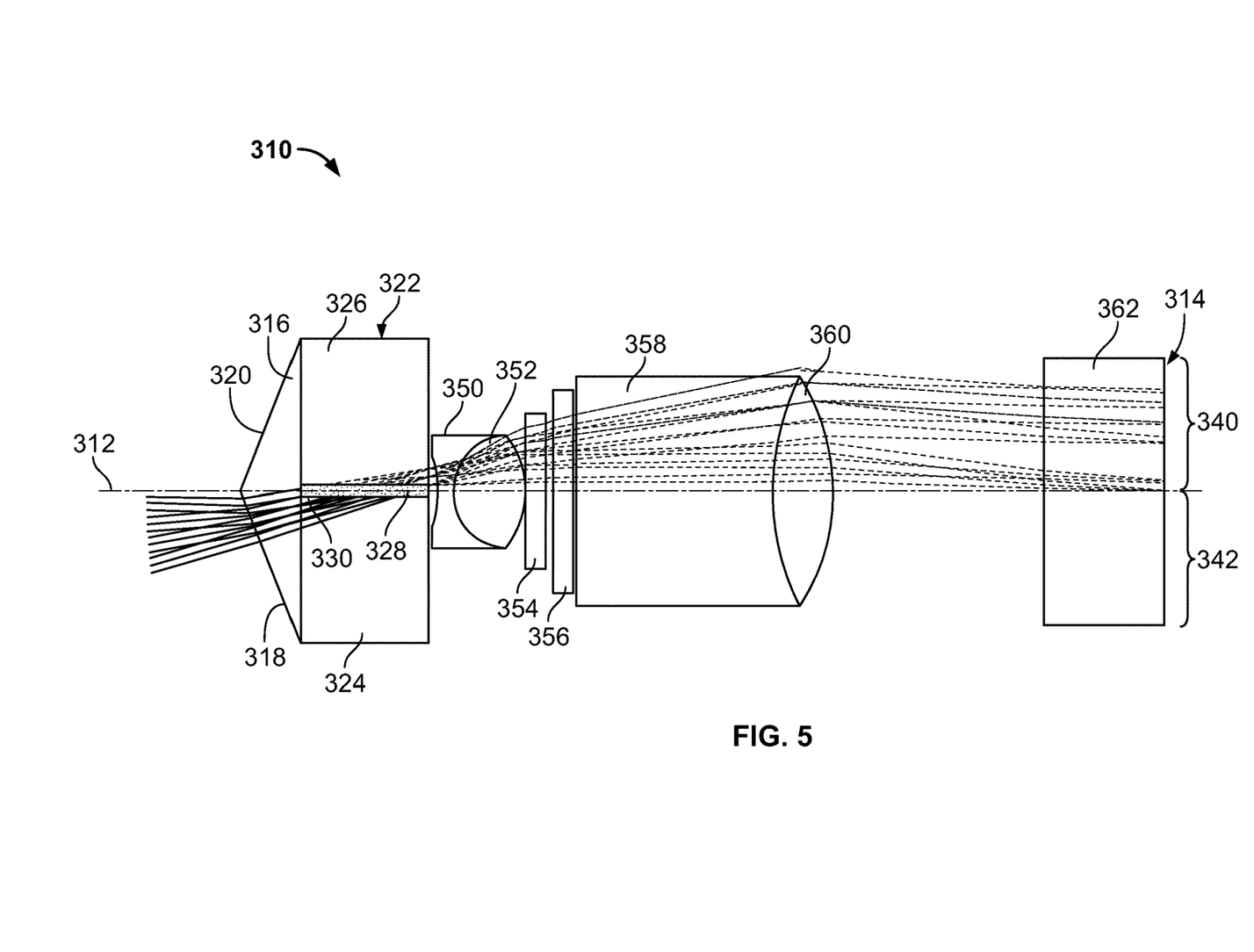
FIG. 5 is a view similar to FIG. 4, but showing unwanted imaging paths that would actually be blocked.

FIGS. 4 and 5 provide an example a stereoscopic optical system 310 that can include another optical arrangement extending along a center optical axis 312 toward a focal plane 314. Note that the optical arrangement can include a roof prism 316, with first and second roof segments 318, 320, as a first or left-most element of the optical arrangement. The optical arrangement can include a first window 322 located next to or immediately next to (i.e., immediately right along the axis 312) to the roof prism 320. The first window 322 can be a plano split glass window. As such, the window 322 can be provided as two separate portions or pieces 324, 326 with a separation plane 328 that extends between the two portions. The separation plane 328 can be planar and can extend parallel to the optical axis 312. Specifically, the separation plane 328 can be conjoint with the optical axis 312. As such the optical axis 312 can extend (i.e., lie) in the separation plane 328. Or in other words, the separation plane 328 can lie on the optical axis 312. An opaque optical barrier 330 can be located at the separation plane 328 of the first window 322. As such, the optical barrier 330 can be within the sequence of optical elements. Within the shown example of FIGS. 4 and 5, the optical barrier 330 is planar and the optical barrier extends parallel to the center optical axis 312. The optical barrier 330 can be configured to block rays that impinge against the optical barrier. As such, the optical barrier 330 can be configured to prevent light rays from passing therethrough. Thus, the optical barrier 330 can prevent at least some rays that pass through the first roof segment 318 from reaching a first stereoscopic image area 340 at the image plane 314 and can prevent at least some rays that pass through the second roof segment 320 from reaching a second stereoscopic image area 342 at the image plane.

Within the example, the optical barrier 330 can be optically absorbent material or baffle. Also, within the example, the optical barrier 330 can be a coating, with the coating being between the two portions 324, 326 of the split glass window 322, and the coating extending in the plane that contains the center optical axis 312. The coating can be an applied coating (i.e., applied to one or both of the portions of the split glass window). Alternatively, the optical barrier could be a separate plate (e.g., a metal plate) located between the two portions of the split glass window. The thickness of the barrier (e.g., coating/plate) 330 can be varied and may be chosen based upon various factors such as type, sizing, configuration, etc. of the system and the other components therein.

Continuing in a procession, from left to right within FIGS. 4 and 5, from the first window 322 and along the optical axis 312, the overall optical arrangement can include a first lens 350, a second lens 352, a second window 354, a third window 356, a third lens 358 and/or a fourth lens 360. The lenses may be varied. For example, note that the first and second lenses 350, 352 are illustrated as a first doublet and the third and fourth lenses 358, 360 are illustrated as a second doublet. However, it is possible that doublets are not used and only single, individual lenses are used. The lenses have respective optical centers located on the center optical axis 312. The lenses and the roof prism may be of any suitable optical material. For example, the roof prism may be made of sapphire material. Also, the windows may be of any suitable optical material, with one example material being sapphire.

Similar to previous examples the center optical axis 312 extends to the image plane 314, with the image plane being on the right as viewed within FIGS. 4 and 5. An image member 362 can be or can include an image window (also referred to with reference numeral 362). The image plane 314 can be at the right-most surface of the image window 362 of the shown example as viewed within FIGS. 4 and 5. The image member 362 could also include an image capturing element, such a charge-coupled display (CCD), etc. The elements illustrated of the image member 362, are possible components contained therein and may vary or not be included at all in some embodiments. As mentioned, within the image plane 314 may be: the first stereoscopic image area 340 on a first side of the optical axis 312 for receipt of a first stereoscopic image thereon and the second, separate stereoscopic image area 342 on a second, separate side of the optical axis for receipt of a second, separate stereoscopic image thereon. Within the Figure, the first side can be above the optical axis 312 and the second side can be below the optical axis. In the Figure, these are shown in an up and down orientation, but it is to be appreciated that it is translatable to left and right orientation. The two stereoscopic images may be formed at the image plane.

Also, it should appreciated the optical elements could be separable into two groups. For, example, the two groups could be separated between the second and third windows 354, 356. It is possible to consider the first portion to be a detachable stereo vision system and to consider the second portion together with the image member as a primary camera. The detachable stereo vision system is attached to the primary camera for the purpose of providing the stereoscopic images. All or part of the sequence of optical elements 316, 322 and 350-360 can be considered to be an optical arrangement extending along the optical axis 312. The constituent parts (e.g., the portions 324, 326 and the barrier 330) of the first window 322 can be part of the optical arrangement.

As a comparison of FIGS. 4 and 5, note that the two Figures show two types of rays. Such rays are: (a) rays that are permitted passage to the imaging plane 314, as shown in FIG. 4, and (b) rays that are prevented from passing to the imaging plane, as shown in FIG. 5. Note that within FIG. 4, the shown rays pass through the plano split window 322 without being blocked by the barrier/coating 330. However, as shown within FIG. 5, undesirable rays (i.e., rays that contribute to image degradation) are blocked by the barrier/coating 330. In FIG. 5 the blocked rays are shown by the dash-phantom lines within the Figure.

Figure 6:
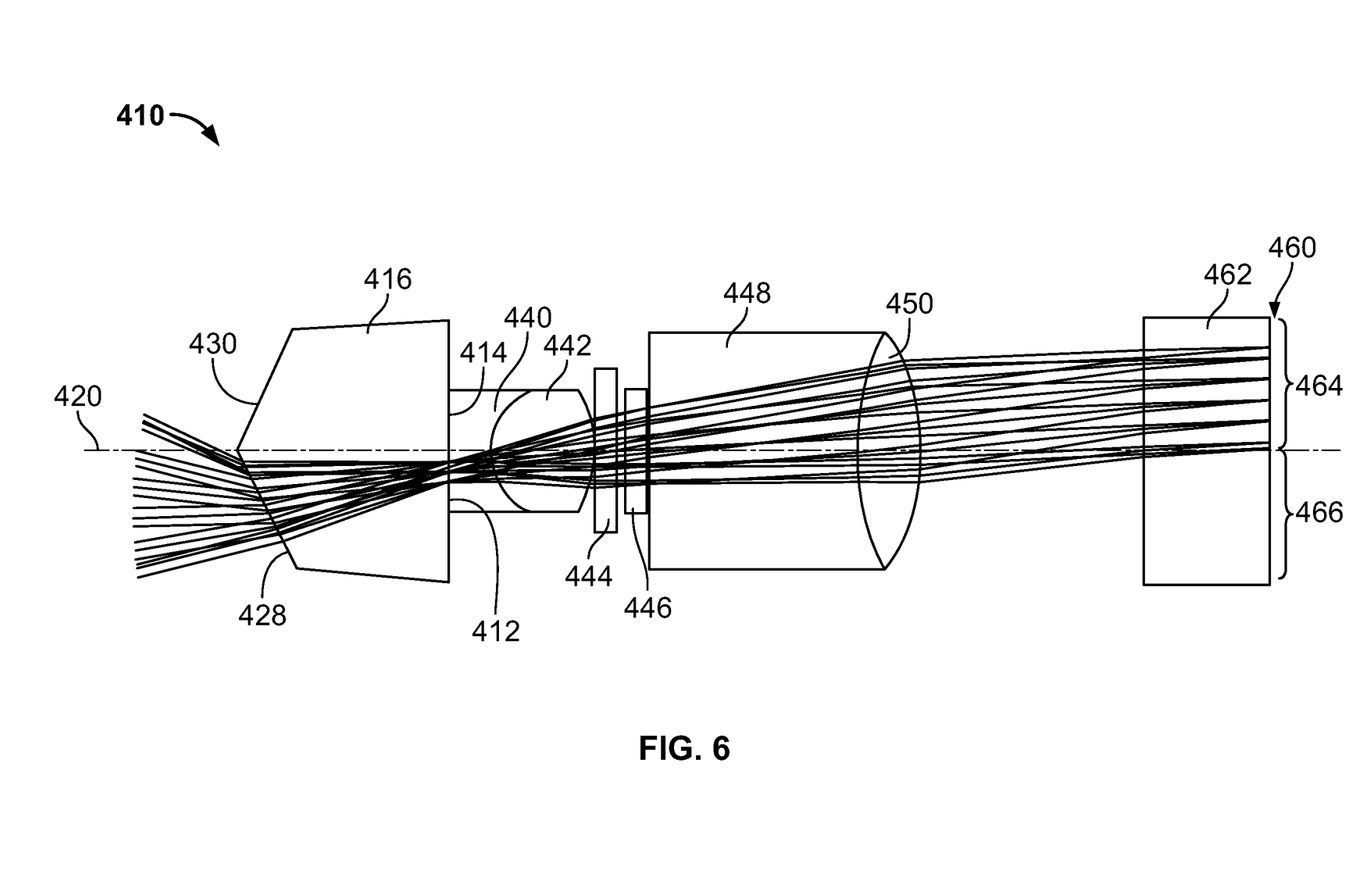
FIG. 6 is a schematic representation of a further example of the novel design, second type, showing desired imaging paths of one of two stereo images.
Figure 7:
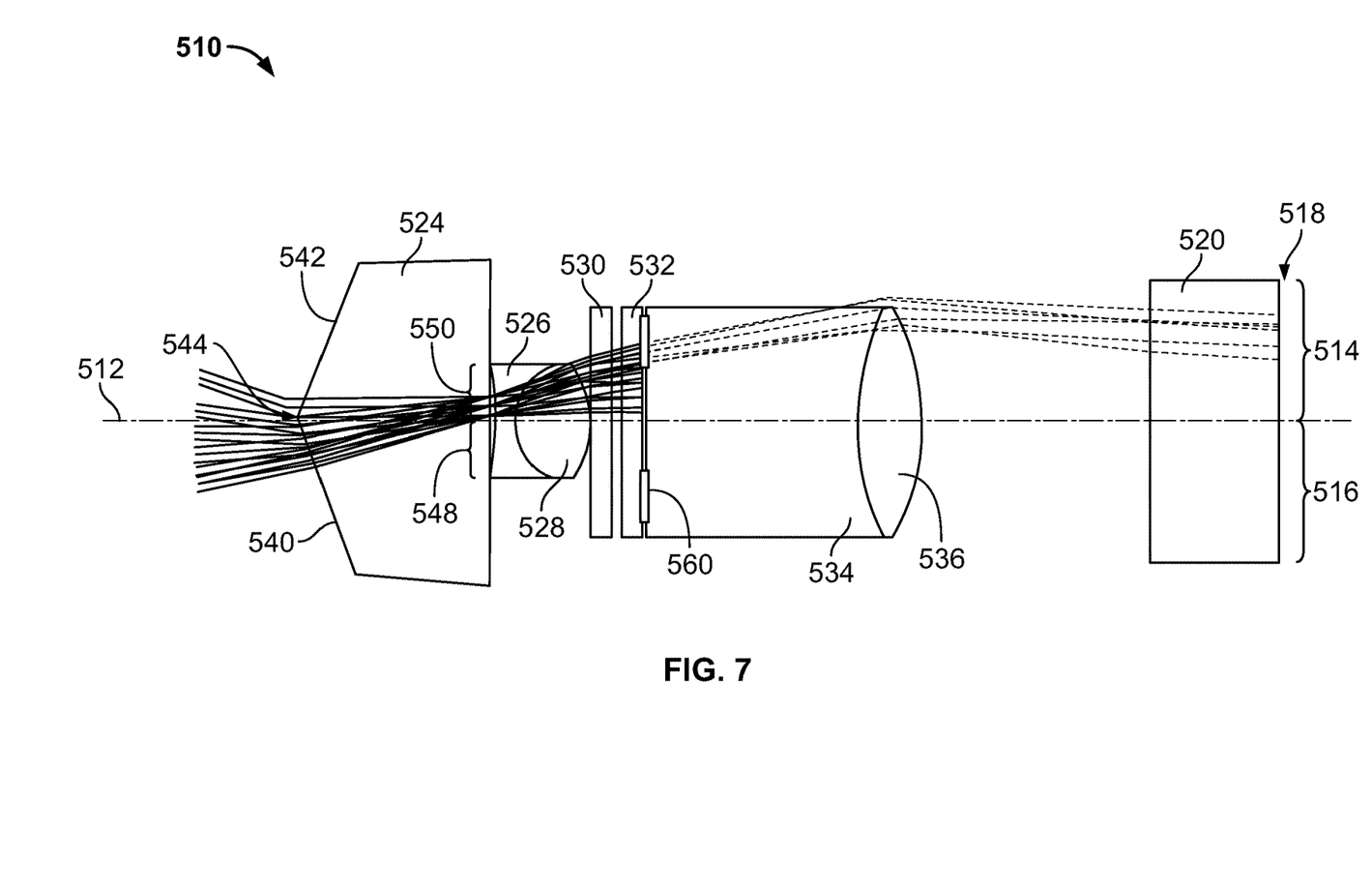
FIG. 7 is a schematic representation of yet still another example of the novel design, second type, but showing unwanted imaging paths that would actually be blocked by one or more aspects of elements.

It is to be appreciated that the examples shown within FIGS. 2-5 are a first type of example stereoscopic optical system. Specifically, this first type may include an optical barrier/baffle or similar element located within the sequence of optical elements to prevent at least some undesirable, image-degrading rays from reaching the image area. It is to be further appreciated that there are other types of example stereoscopic optical systems. FIGS. 6 and 7, present examples of at least another, type of stereoscopic optical system, referred to as a "second type" herein. Specifically, the second type of stereoscopic optical system can include at least one optical element that has a respective dimension selected to prevent undesirable, image-degrading rays from reaching the image area.

Focusing upon FIG. 6, the Figure is a schematic representation of an example of the novel design, second-type, stereoscopic optical system 410. It is to be appreciated that the Figure shows a desired imaging path of one of two stereo images. This second type may not need to include a baffle or split glass plate/window/prisms with blackened light absorbing barrier/baffle/coating in between to separate the imaging path for each aperture. Instead, the second type may use physical size(s) of one or more lens(es) of the system and, possibly one or more field stop(s) at certain positions to block imaging rays from going to the "wrong" side aperture.

The shown example of FIG. 6 is only an example and need not present a specific limitation. It is contemplated and possible that a different system, with different lenses and/or different windows and/or having a different arrangement/sequence, etc. can be utilized. However, it is to be noted that in some embodiments, only a single, rather than two, optical system (i.e., lens(es) and/or window(s) and imager(s)) is present.

Note that two apertures 412, 414 are illustrated within the system 410. Specifically, in the shown example, the apertures 412, 414 can be located at the back or far side of a roof prism (or bi-prism) 416. The first aperture 412 can be shifted/located down (in the context of the illustration of FIG. 6) from a main/center optical axis 420. The second aperture 414 can be shifted/located up (in the context of the illustration of FIG. 6) from the main/center optical axis 420. The first aperture 412 can be shifted off of the center optical axis 420 in a first direction (i.e., down) transverse to the center optical axis, and the second aperture 414 can be shifted off of the center optical axis in a second direction (i.e., up) transverse to the center optical axis. The second direction (i.e., up) can be substantially opposite to the first direction (i.e., down). Recall that the previously known device (FIG. 1) has a single aperture centered on the main/center optical axis.

Returning to FIG. 6, for each roof segment 428, 430 of the roof prism 416, and thus the two apertures 412, 414, the operation can be basically the same. As such, FIG. 6 shows the operation for just the first roof segment 428. It is to be understood that the operation for the second roof segment 430 will be basically the same. Note that as shown within FIG. 6, the rays can pass through the respective aperture 412 without being blocked.

Proceeding from left to right within FIG. 6 and along the optical axis 420, the overall optical system 410 can include: the roof prism (or bi-prism) 416, a first lens 440 a second lens 442, a first window 444, a second window 446, a third lens 448 and/or a fourth lens 450. The roof prism 416, the first lens 440, the second lens 442 and the first window 444 may be grouped together as first portion of the optical arrangement. The second window 446, the third lens 448 and the fourth lens 450 may be grouped together as a second portion of the optical arrangement. The first portion may be detachable from the second portion, with at least the windows 444, 446 providing boundaries from the outside environment. Such boundaries can provide a barrier to prevent outside influences (e.g., dirt, moisture, etc.) from engaging portions of the optical arrangement (e.g., the lenses). The lenses can have respective optical centers located on the center optical axis 420. The lenses and the roof prism may be of any suitable optical material. For example, the roof prism may be made of sapphire material. Also, the windows may be of any suitable optical material, with one example material being sapphire. All or part of the sequence of optical elements 416 and 440-450 can be considered to be an optical arrangement extending along the optical axis 420. The apertures, e.g., the first and second apertures 412, 414 at the first lens 440, can be part of the optical arrangement.

With attention back to the two apertures 412, 414, each aperture can be provided, at least in part, via a selected sizing of a first lens 440, see that the first lens 440 can have a respective dimension (i.e., a diameter) extending transverse to the center optical axis 420. Note that the diameter can be comparatively small as compared to the immediately adjacent dimension, again taken transverse to the optical axis, of the roof prism 416. This difference in respective dimensions can prevent at least some rays reaching an image plane 460 at an imaging device 462. In the shown example, desirable rays that pass through the first roof segment 428 are shown reaching a first of two stereoscopic image areas 464, 466. In the Figure, these are shown in an up and down orientation, but it is to be appreciated that it is translatable to left and right orientation. One specific, example lens prescription is provided within the following Table 1. Such lens prescription are only exemplary and may not to be considered as a limitation upon the present subject matter as other lens prescriptions for other examples are contemplated.

TABLE 1

| Surface | Surface type | Y Radius | Thickness | Glass | Refract mode | Y Semi-Aperture | Non-Centered Data |
|---|---|---|---|---|---|---|---|
| Object | Sphere | Infinity | 5.000 | | Refract | | |
| 1 | Sphere | Infinity | 0.000 | | Refract | 1.176 | |
| 2 | Sphere | Infinity | 2.450 | SAPHIR_ | Refract | 1.137 | Decenter & Return |

TABLE 1-continued

| Surface | Surface type | Y Radius | Thickness | Glass | Refract mode | Y Semi-Aperture | Non-Centered Data |
|---|---|---|---|---|---|---|---|
| 3 | Sphere | Infinity | 0.005 | | Refract | 0.350 | |
| Stop | Sphere | Infinity | 0.050 | | Refract | 0.111 | Decenter & Return |
| 5 | Sphere | Infinity | 0.050 | | Refract | 0.351 | |
| 6 | Sphere | −1.820 | 0.460 | NSF6HT | Refract | 0.351 | |
| 7 | Sphere | 0.780 | 1.190 | F2HT_SC | Refract | 0.410 | |
| 8 | Sphere | −1.370 | 0.005 | | Refract | 0.588 | |
| 9 | Sphere | Infinity | 0.000 | | Refract | 0.591 | |
| 10 | Sphere | Infinity | 0.254 | SAPHIR_ | Refract | 0.700 | |
| 11 | Sphere | Infinity | 0.100 | | Refract | 0.700 | |
| 12 | Sphere | Infinity | 0.254 | SAPHIR_ | Refract | 0.640 | |
| 13 | Sphere | Infinity | 0.025 | | Refract | 0.693 | |
| 14 | Sphere | Infinity | 0.000 | | Refract | 0.500 | |
| 15 | Sphere | 125.000 | 2.450 | NSF66_S | Refract | 0.704 | |
| 16 | Sphere | 3.170 | 0.006 | 500000. | Refract | 1.209 | |
| 17 | Sphere | 3.170 | 0.750 | SLAH65_ | Refract | 1.211 | |
| 18 | Sphere | −2.600 | 2.620 | | Refract | 1.255 | |
| 19 | Sphere | Infinity | 1.200 | BK1_SCH | Refract | 1.232 | |
| 20 | Sphere | Infinity | 0.300 | BK1_SCH | Refract | 1.226 | |
| 21 | Sphere | Infinity | 0.035 | | Refract | 1.228 | |
| 22 | Sphere | Infinity | 0.000 | | Refract | 1.232 | |
| Image | Sphere | Infinity | 0.000 | | Refract | 1.232 | |

So, it is to be appreciated that FIG. 6 and Table 1 provide an example optical arrangement that can include a sequence of optical elements positioned and/or spaced along the center optical axis, each of the optical elements has a respective dimension extending transverse to the center optical axis, at least one of the optical elements has the respective dimension selected to prevent at least some rays passing through the first roof segment from reaching the first stereoscopic image area and/or to prevent at least some rays passing through the second roof segment from reaching the second stereoscopic image area.

Focusing upon FIG. 7, shown is a schematic example representation of stereoscopic optical system 510. The optical system 510 is an example of a novel design, second type. It is to be appreciated that the Figure shows undesired imaging path that would actually be blocked by one or more aspects of elements. As illustrated, the shown rays that are in dash-phantom are fictitious and are shown only to illustrate that they would not exist/proceed.

The optical system 510 extends along an optical axis 512 and can provide two stereoscopic images 514, 516 at an image plane 518. The image plane 518 can be at an image device 520. In the Figure, these are shown in an up and down orientation, but it is to be appreciated that it is translatable to left and right orientation. Proceeding from left to right within FIG. 7 and along the optical axis 512, the overall optical system 510 can include, as an optical arrangement: a roof prism (or bi-prism) 524, a first lens 526 a second lens 528, a first window 530, a second window 532, a third lens 534 and/or a fourth lens 536. The lenses may have respective optical centers located on the center optical axis 512. The lenses and the roof prism may be of any suitable optical material. Also, the windows may be of any suitable optical material, with one example material being sapphire. All or part of the sequence of optical elements 524-536 can be considered to be an optical arrangement extending along the optical axis 512.

Within the example of FIG. 7, it is physical size of at least some of the lens(es) and/or window(s) and/or other structures that would block/terminate some rays (i.e., they would not exist or cease to exist prior to reaching the image plane).

Within the presented example, fictitious rays are presented in connection with a first 540 of two roof segments 540, 542 of the roof prism 524. It can be appreciated that similar blocking/termination of some rays can occur for the second roof portion 542. The desire to block these rays is based at least partially upon an appreciation that these rays would degrade the stereoscopic images at the image plane 518. In part, these rays may or would proceed through a wrong one of the two apertures 548, 550 at the junction of the roof prism 524 and the first lens 526.

Turing to the blocked/terminated, and thus fictitious, rays that are shown within FIG. 7, each of the rays may be blocked/terminated for one or more reason. For example, note that on the upper most fictitious rays at the roof prism 524 in FIG. 7 may not even exist (or so proceed) since they are impinging upon the other roof segment 542 (i.e., upper as viewed within FIG. 7) beyond an apex 544 of the roof prism 524. Next, note that the physical size of at least some of the lens(es) and/or window(s) may block/terminate some more rays (i.e., they would not exist or cease to exist prior to reaching the image plane. Specifically, see that the diameter sizes of each of the second and fourth lenses 528 and 536 can be selected such that the some of the rays simply cannot proceed.

Still further, it is possible to include one or more field stops 560 interposed into the sequence of optical elements located along the center optical axis 512 to block/terminate some unwanted rays. Within the shown example the field stop 560 can be located between the second window 532 and the third lens 534. The field stop 560 can be part of the optical arrangement.

So, it is to be appreciated that FIG. 7 provides an example optical arrangement that includes a sequence of optical elements positioned and/or spaced along the center optical axis, each of the optical elements has a respective dimension extending transverse to the center optical axis, at least one of the optical elements has the respective dimension selected to prevent at least some rays passing through the first roof segment from reaching the first stereoscopic image area and to prevent at least some rays passing through the second roof segment from reaching the second stereoscopic image area.

An additional benefit (i.e., additional to the benefit(s) of the subject matter itself) in some circumstances of this second type of design can be that it does not need to have a baffle or split glass plate/window/prisms with blackened light absorbing coating in between to separate the imaging path for each aperture. Another advantage of this second type of design in some circumstances can be that the design can simplify the mechanical design and assembly complexity, and also reduce cost from the complicated split glass plate/window/prisms with blackened light absorbing coating in between.

The new design, with dual aperture for each side of the roof prism slanted imaging ray path surface, can provide for significant improvement regarding the above-mentioned issues. The improvements can include one or more of the following:

1. A center of the image has better image quality (contrast, resolution, and less image variation due to tolerance).
2. More symmetric (e.g., left to right, or up and down as viewed in the Figures) for better matching.
3. Better overall performance over the Depth of Field (DOF) (e.g., larger DOF).
4. Better color separation correction, especially for best focus distances.
5. Larger image separation for more accurate measurement or better 3D effect.
6. Significantly improved tolerance over the entire DOF.

It may now be appreciated that having two separated apertures, each at a shifted position for each side stereo imaging optical path, allows for easier optimization as compared to one single aperture at a centered location. In light of the embodiments disclosed herein, some unwanted ray paths between the two apertures may be blocked. Some additional aspects include: Stereo imaging optics design with roof prism (or bi-prism) with separated dual apertures for each stereo image, and use a baffle or other ways to separate the two stereo imaging paths within a single lens train. There may be a number of designs to accomplish the objectives and advantages set out herein, such as the first type shown in FIGS. 2-5 and the second type is shown in FIGS. 6 and 7.

Some example advantages over existing stereo imaging optics may include:
1. One single camera system, rather than dual camera systems for stereo imaging.
2. Benefits over traditional roof prism (or bi-prism) systems with single aperture, such as:
a. Better image quality (contrast, resolution, color separation, larger Depth of field) for each side stereo image.
b. Larger stereo image separation for more accurate measurement or better 3D imaging effect.
c. More robust optical performance concerning parts and assembly tolerance.

The disclosed subject matter has been presented with reference to the example embodiments described above. Modifications and alterations will occur to others upon a reading and understanding of this specification. Example embodiments incorporating one or more aspects of the subject matter are intended to include all such modifications and alterations insofar as they come within the scope of the appended claims.

What is claimed:

1. A stereoscopic optical system comprising:
an image member comprising an image capturing element located at a position along a center optical axis and including a first stereoscopic image area on a first side of the optical axis for receipt of a first stereoscopic image thereon and a second, separate stereoscopic image area on a second, separate side of the optical axis for receipt of a second, separate stereoscopic image thereon; and
an optical arrangement extending along the center optical axis comprising:
a roof prism comprising a first roof segment and a second roof segment;
a sequence of optical elements positioned along the center optical axis;
an opaque, planar optical barrier located within the sequence of optical elements and extending parallel to the center optical axis;
wherein the optical arrangement being configured to transmit image-forming rays passing through the first roof segment to the first stereoscopic image area along a first optical path through the optical arrangement and configured to transmit image-forming rays passing through the second roof segment to the second stereoscopic image area along a second, different optical path through the optical arrangement; and
wherein the optical barrier is configured to prevent at least some rays passing through the first roof segment from reaching the first stereoscopic image area and to prevent at least some rays passing through the second roof segment from reaching the second stereoscopic image area.

2. The stereoscopic optical system as set forth in claim 1, wherein the center optical axis extends in the plane of the barrier.

3. The stereoscopic optical system as set forth in claim 1, wherein the sequence of optical elements includes a split glass window having two portions, and the optical barrier is located between the two portions of the split glass window.

4. The stereoscopic optical system as set forth in claim 3, wherein the optical barrier is a coating located between the two portions of the split glass window.

5. The stereoscopic optical system as set forth in claim 1, wherein the optical barrier is a baffle.

6. The stereoscopic optical system as set forth in claim 1, wherein the optical arrangement includes a first aperture and a second aperture located within the sequence of optical elements, each of the first and second apertures is shifted off of the center optical axis, the first aperture is configured to prevent at least some rays passing through the first roof segment from reaching the first stereoscopic image area and the second aperture is configured to prevent at least some rays passing through the second roof segment from reaching the second stereoscopic image area.

7. The stereoscopic optical system as set forth in claim 6, wherein the first aperture is shifted off of the center optical axis in a first direction transverse to the center optical axis, the second aperture is shifted off of the center optical axis in a second direction transverse to the center optical axis, and the second direction is opposite to the first direction.

8. The stereoscopic optical system as set forth in claim 1, wherein the optical arrangement includes a sequence of optical elements spaced along the center optical axis, each of the optical elements has a respective dimension extending transverse to the center optical axis, at least one of the optical elements has the respective dimension selected to prevent at least some rays passing through the first roof segment from reaching the first stereoscopic image area and to prevent at least some rays passing through the second roof segment from reaching the second stereoscopic image area.

9. The stereoscopic optical system as set forth in claim 1, wherein the optical arrangement includes a sequence of optical elements positioned along the center optical axis, each of the optical elements has a respective dimension extending transverse to the center optical axis, at least some of the optical elements have the respective dimensions selected to prevent at least some rays passing through the first roof segment from reaching the first stereoscopic image area and to prevent at least some rays passing through the second roof segment from reaching the second stereoscopic image area.

10. The stereoscopic optical system as set forth in claim 1, wherein the optical arrangement includes a field stop positioned along the center optical axis, the field stop has a respective dimension extending transverse to the center optical axis, the dimension is selected to prevent at least some rays passing through the first roof segment from reaching the first stereoscopic image area and to prevent at least some rays passing through the second roof segment from reaching the second stereoscopic image area.

11. A stereoscopic optical system comprising:
an image member comprising an image capturing element located at a position along a center optical axis and including a first stereoscopic image area on a first side of the optical axis for receipt of a first stereoscopic image thereon and a second, separate stereoscopic image area on a second, separate side of the optical axis for receipt of a second, separate stereoscopic image thereon; and
an optical arrangement extending along the center optical axis, the optical arrangement including;
a roof prism having first and second roof segments, and having an apex located on the center optical axis;
a single lens sequence having plural lenses spaced along the center optical axis, with each of the plural lenses having an optical center located on the center optical axis, the single lens sequence being configured to transmit image-forming rays passing through the first roof segment to the first stereoscopic image area along a first optical path and configured to transmit image-forming rays passing through the second roof segment to the second stereoscopic image area along a second, different optical path; and
at least one element configured to prevent at least some rays passing through the first roof segment from reaching the first stereoscopic image area and to prevent at least some rays passing through the second roof segment from reaching the second stereoscopic image area, the at least one element including an opaque optical barrier that extends parallel to the center optical axis.

12. The stereoscopic optical system as set forth in claim 11, wherein optical arrangement includes a split glass window having two portions, and the optical barrier is located between the two portions of the split glass window.

13. The stereoscopic optical system as set forth in claim 11, wherein the optical barrier is a baffle.

14. The stereoscopic optical system as set forth in claim 11, wherein the at least one element includes first and second apertures, each of the first and second apertures is shifted off of the center optical axis, the first aperture is configured to prevent at least some rays passing through the first roof segment from reaching the first stereoscopic image area and the second aperture is configured to prevent at least some rays passing through the second roof segment from reaching the second stereoscopic image area.

15. The stereoscopic optical system as set forth in claim 14, wherein the first aperture is shifted off of the center optical axis in a first direction transverse to the center optical axis, the second aperture is shifted off of the center optical axis in a second direction transverse to the center optical axis, and the second direction is opposite to the first direction.

16. The stereoscopic optical system as set forth in claim 11, wherein each of the lenses has a respective dimension extending transverse to the center optical axis, the at least one element includes at least some of the lenses that have the respective dimensions selected to prevent at least some rays passing through the first roof segment from reaching the first stereoscopic image area and to prevent at least some rays passing through the second roof segment from reaching the second stereoscopic image area.

17. The stereoscopic optical system as set forth in claim 11, wherein each of the lenses has a respective dimension extending transverse to the center optical axis, the at least one element includes at least one of the lenses that has the respective dimension selected to prevent at least some rays passing through the first roof segment from reaching the first stereoscopic image area and to prevent at least some rays passing through the second roof segment from reaching the second stereoscopic image area.

18. The stereoscopic optical system as set forth in claim 11, wherein the at least one element includes a field stop positioned along the center optical axis, the field stop has a respective dimension extending transverse to the center optical axis, the dimension is selected to prevent at least some rays passing through the first roof segment from reaching the first stereoscopic image area and to prevent at least some rays passing through the second roof segment from reaching the second stereoscopic image area.

* * * * *